July 27, 1965 H. D. JONES, JR 3,197,590
DEVICE FOR OPENING OR CLOSING AN ELECTRICAL CIRCUIT
WHEN A PARTICULAR LIQUID LEVEL IS REACHED
Filed Sept. 1, 1961 2 Sheets-Sheet 1

INVENTOR.
HAROLD D. JONES, JR.
BY

July 27, 1965 H. D. JONES, JR 3,197,590
DEVICE FOR OPENING OR CLOSING AN ELECTRICAL CIRCUIT
WHEN A PARTICULAR LIQUID LEVEL IS REACHED
Filed Sept. 1, 1961
2 Sheets-Sheet 2
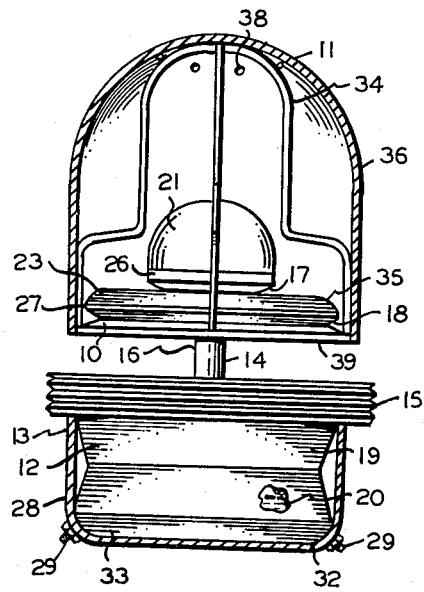
FIG.3
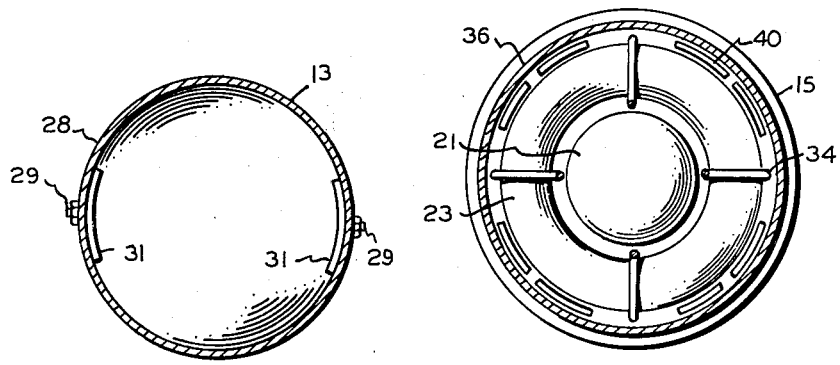
FIG.5                    FIG.4
INVENTOR.
HAROLD D. JONES, JR.
BY

United States Patent Office 3,197,590
Patented July 27, 1965

3,197,590
DEVICE FOR OPENING OR CLOSING AN ELECTRICAL CIRCUIT WHEN A PARTICULAR LIQUID LEVEL IS REACHED
Harold D. Jones, Jr., 1317 William-Oliver Bldg., Atlanta, Ga.
Filed Sept. 1, 1961, Ser. No. 135,619
7 Claims. (Cl. 200—83)

This invention relates to device for indicating when a liquid has reached a particular predetermined level and more particularly, to a device which will open or close a point in an electrical circuit when the liquid in a container reaches a certain predetermined level and which has no elements slidably passing through the container and no electrical elements inside the container.

There are many applications in which it is necessary to initiate the pumping of additional liquid into a container, the transfer of liquid input or output from one container to another or the sounding of an alarm when the liquid in a container reaches a certain specified level. In many of these applications, it is highly desirable that the device used to initiate these or other actions has no components slidably passing into the container which would require elaborate sealing means to prevent liquid leakage from the container, and in some applications where the liquid or its vapor in the container is explosive, it is impervious that the components of the device within the container not be of such a nature as to ignite the liquid or its vapor. Typical of applications in which container leaking and electrical components of the device within the container are to be avoided is the detecting of when gasoline in a gasoline container has reached a certain predetermined level so that the gasoline in a storage tank can be maintained at a certain level by pumping, aircraft fuel supply can be automatically shifted from one fuel tank to another, or an alarm can be sounded when an automobile gasoline tank is almost empty.

For example, although automobile gasoline tanks are normally associated with quantity indicators, these quantity indicators generally show empty for a substantial period of time prior to the actual empty condition being reached in the gasoline tank. Therefore, drivers of automobiles customarily gamble on the distance which they can drive with the gasoline quantity indicator reading empty and as a result often run out of gasoline. Moreover, these quantity indicators will occasionally malfunction and cause even a careful driver to run out of gasoline. The invention described herein can be safely and effectively used to solve this problem since in miniaturized form it can be inserted into an automobile gasoline tank as a replacement for the drain plug of the gasoline tank and used to electrically actuate an alarm when the level of the gasoline in the gasoline tank has reached a critical point.

Used in such an application or in any other application, the invention described herein will not permit the leaking of the contents of the container since it has no moving components extending through the wall of the container and will not cause an explosion within the container since it has no electrical elements within the container. Moreover, the invention is not susceptible to any undesired opening or closing of an electrical circuit for a pump, transfer valve or alarm which might result from the surging of the liquid in the container or the motion of the container. In addition, the invention has a minimum of moving mechanical components and is not only highly durable and reliable, but does not require periodic adjustment and servicing to insure its continued sensitivity to liquid level.

These advantages and improvements are achieved by a liquid level indicator which senses liquid level within a container with an expandable-collapsible component placed in the container and which uses an expandable-collapsible component outside the container to open and close a point in an electrical circuit in response to the motion of the expandable-collapsible component in the container. Not only are all electrical contact points outside the container, but only a non-moving tube passes through the container wall in order to join the interiors of the two expandable-collapsible components. In addition, the distances of expansion and collapse of the internal and external expandable-collapsible components are disproportionately related. This relationship not only provides response to a specific liquid level but also tends to prevent any surging of the liquid in the container from closing the electrical contact, an advantage of the indicator which is further improved by use of a protective cover for the components of the indicator within the container.

These and other features of the invention will be more clearly understood from the following detailed description and the accompanying drawings in which like characters designate corresponding parts in all figures and in which:

FIGURE 3 is a side elevational view of the indicator shown in FIGURE 1 but with the upper protective cover and the lower protective cover in section so as to show the indicator components within these covers as they would appear when an electrical circuit through the indicator is closed because the liquid in a container is at or below a specified level.

FIGURE 4 is a sectional view of the indicator taken in line 4—4 in FIGURE 1 and with the components within the upper protective cover in that position shown in FIGURE 3.

FIGURE 5 is a sectional view of the indicator taken in line 5—5 in FIGURE 1 and with the components within the lower protective cover in that position shown in FIGURE 2.

Figure 1:
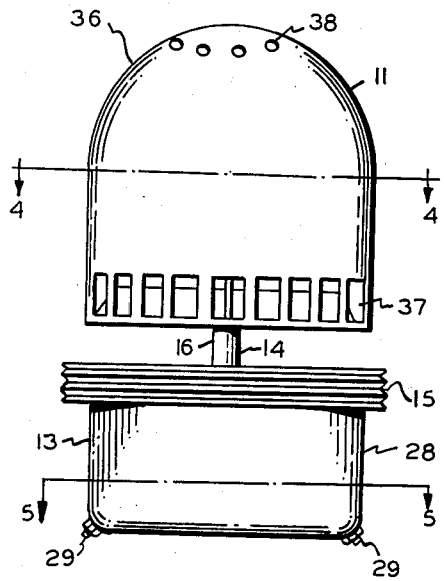
FIGURE 1 is a side elevational view of the indicator with its external and internal portions on opposite sides of a plug which can be used to replace the drain plug in the gasoline tank of an automobile or inserted in any appropriate opening in a container.
Figure 2:
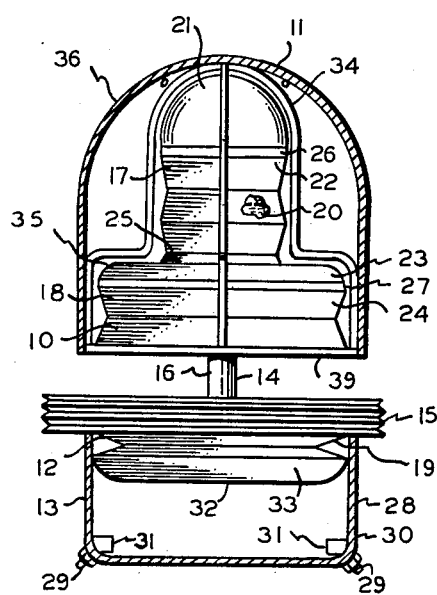
FIGURE 2 is a side elevational view of the indicator shown in FIGURE 1 but with the upper protective cover and the lower protective cover in section so as to show the indicator components within these protective covers as they appear when an electrical circuit through the indicator is open because the liquid in a container is above a specified level.

These figures and the following detailed description disclose a preferred specific embodiment of the invention, but the invention is not limited to the details disclosed since it may be embodied in other equivalent forms.

The invention is most easily understood by considering it to be comprised of an expandable-collapsible component 10 which with other elements forms the internal portion 11 of the indicator within a container, a second expandable-collapsible component 12 which with other elements forms the external portion 13 of the indicator outside the container, and a connecting tube 14 which passes through the wall of the container to join these two expandable-collapsible components 10 and 12. In the specific embodiment described herein, the invention is adapted for use with gasoline tanks of automobiles and the wall of the container is shown as a threaded circular plug 15 which can be used to replace the drain plug customarily found in automobile gasoline tanks. It is evident that this particular arrangement makes it easy to install the indicator in the gasoline tanks of existing automobiles or in any other container having an appropriate access hole.

Moreover, it should be noted that in the specific embodiment shown herein, the connecting tube 14 extends not only through the plug 15 or container wall, but also for a significant distance within the container and that this feature may be used to orient the internal portion 11 of the indicator so that the line of motion of its expandable-collapsible component 10 is perpendicular to the ground by bending the extending length 16 of the connecting tube 14. This bending of the connecting tube 14 will be necessary when the drain plug 15 or other point for installing the indicator in a container is not in the bottom or similar portion of the container. The desirability of positioning the internal portion 11 of the indicator for motion of its expandable-collapsible component 10 in a direction generally perpendicular to the ground will become apparent. However, it will also become apparent that no such positioning restriction is necessary with respect to the external portion 13 of the indicator and that when orientation of the internal portion 11 of the indicator by bending the connecting tube 14 is not required, the connecting tube 14 may be no longer than is necessary to pass through the wall or plug 15 of the container or may be simply the extension of one of the expandable-collapsible components 10 or 12. On the other hand, a specific length 16 for the connecting tube 14 may be used simply to place the internal portion 11 of the indicator a desired distance from the point in the container at which it is necessary to install the indicator.

In the specific embodiment described herein, the expandable-collapsible component 10 of the internal portion 11 of the indicator is comprised of an upper internal bellows 17 and a lower internal bellows 18 having their interiors joined. The upper internal bellows 17 has a diameter smaller than the diameter of the lower internal bellows 18 and a length greater than the length of the lower internal bellows 18. The expandable-collapsible component 12 of the external portion 13 of the indicator is a single external bellows 19 having a diameter substantially equal to the diameter of the lower internal bellows 18 and a length sufficiently greater than that of the lower internal bellows 18 so that the expanded interior volume of the external bellows 19 is equal to the total expanded interior volumes of the two internal bellows 17 and 18.

As already noted, the internal 10 and external 12 expandable-collapsible components of the indicator are joined by a connecting tube 14. Specifically, this is accomplished by extending the connecting tube 14 from the interior of the lower internal bellows 18 into the interior of the external bellows 19 in such a manner as to make the total interior defined by these components 14, 18 and 19 and the upper internal bellows 17 air and liquid tight. Therefore, when a non-volatile liquid 20 is placed within the interior defined by the two internal bellows 17 and 18, the one external bellows 19 and the connecting tube 14 and with either the two internal bellows 17 and 18 or the one external bellows 19 collapsed, bellows motion on one side of the connecting tube 14 and the container wall will result in bellows motion on the other side of the connecting tube 14 and the container wall. Moreover, although the diameters and lengths of the two internal bellows 17 and 18 and the one external bellows 19 are selected so that the sum of the interior volumes of the two internal bellows 17 and 18 when fully expanded equals the interior volume of the one external bellows 19 when fully expanded, the total length or distance moved by the two internal bellows 17 and 18 when expanding or collapsing is disproportionately related to the length or distance moved by the external bellows 19 when expanding or collapsing. This is achieved by having the two internal bellows 17 and 18 differ from each other with respect to diameter and length and by having the two internal bellows 17 and 18 expand or collapse in sequence as the level of a liquid in a container changes.

The difference between internal bellows 17 and 18 with respect to diameter results in the internal bellows 17 and 18 having different interior volumes for the same expandable-collapsible length. Therefore, if the internal bellows 17 and 18 are collapsed or expanded the same distance, the change in the interior volume of internal bellows 17 resulting from such collapse or expansion will be different from that of internal bellows 18. Thus, when the internal bellows 17 and 18 are collapsed or expanded in sequence as the level of a liquid in a container changes, the change in the total interior volume of the internal bellows 17 and 18 for equal changes in the liquid level will vary in magnitude in accordance with which internal bellows 17 or 18 is being collapsed or expanded. Stated differently, as the total length of the internal bellows 17 and 18 changes with changes in liquid level, the rate at which the total interior volume of the internal bellows 17 and 18 changes for equal changes in total length varies in accordance with which internal bellows 17 or 18 is expanding or collapsing.

The difference between internal bellows 17 and 18 with respect to length results in the interior bellows 17 and 18 expanding and collapsing unequal portions of their combined total length of expansion and collapse at the different rates of total interior volume change resulting from the difference between the internal bellows 17 and 18 with respect to diameter. In the specific embodiment of the invention described herein, the internal bellows 17 has a smaller diameter, but a greater length, than the lower internal bellows 18. Thus, because the diameter of the upper internal bellows 17 is smaller, when the upper internal bellows 17 is expanding or collapsing, the total interior volume of the internal bellows 17 and 18 is changing less for a given change in the total length of the internal bellows 17 and 18 than when the lower internal bellows 18 is expanding and collapsing. On the other hand, because the length of the upper internal bellows 17 is greater, the smaller change in the total interior volume resulting from the expansion and collapse of the upper internal bellows 17 will be associated with over half the total expansion and collapse of the two internal bellows 17 and 18.

As already indicated above, this arrangement causes the total length or distance moved by the two internal bellows 17 and 18 as the surface level of a liquid changes to be disproportionately related to the length or distance moved by the external bellows 19. This is because the external bellows 19 is responding to changes in the total interior volume of the internal bellows 17 and 18. Therefore, while the internal bellows 17 and 18 are moving that distance corresponding to the expansion and collapse of the upper internal bellows 17, the external bellows 19 is changing its length more slowly than when the internal bellows 17 and 18 are moving that distance corresponding to the expansion and collapse of the lower internal bellows 18.

Moreover, because the upper internal bellows 17 is of greater length than the lower internal bellows 18, the external bellows 19 will change its length at the slower rate associated with the upper internal bellows 17 during most of the expansion and collapse of the internal bellows 17 and 18. The result is that as the internal bellows 17 and 18 collapse, the external bellows 19 will initially expand only a short distance even though the internal bellows 17 and 18 are collapsing a major portion of their length. The external bellows 19 will expand a majority of its length only while the internal bellows 17 and 18 are collapsing that shorter portion of their total length represented by the length of the lower internal bellows 18. It is obvious that an exactly opposite situation exists when the internal bellows 17 and 18 expand. This disproportionate relationship between the expansion or collapse of the internal bellows 17 and 18 and the expansion and collapse of the external bellows 19 can be further clarified by an example.

For example, if the diameter of the lower internal bellows 18 is two units of measurement such as centimeters and its height or length is one unit, if the diameter of the upper internal bellows 17 is one unit and its height is two units, and if the diameter of the external bellows 19 is two units and its height is one and one-half units, the two internal bellows 17 and 18 together will be equal in interior volume to the interior volume of the one external bellows 19, but the upper internal bellows 17 will have only one-third of the total equated volumes. Therefore, by collapsing and expanding only the upper internal bellows 17 without collapsing or expanding the lower internal bellows 18, the external bellows 19 will collapse or expand only one-third of its length in response to internal bellows 17 and 18 movement representing two-thirds of the total length of the two expanded internal bellows 17 and 18. It is only when the lower internal bellows 18 also expands or collapses that the external bellows 19 is forced to collapse or expand the other two-thirds of its length.

Thus, in the specific example given, the internal bellows 17 and 18 will expand or collapse two-thirds of their total length while the external bellows 19 is collapsing or expanding only one-third of its length. On the other hand, when the internal bellows 17 and 18 are collapsing and expanding that last one-third of their total length associated with lower liquid levels, the external bellows 19 is expanding or collapsing two-thirds of its total length.

It is apparent that as long as the internal bellows 17 and 18 are expanded and collapsed in sequence, the relationship between their collapse and expansion and the expansion and collapse of the external bellows 19 will be a function of the number of internal bellows 17 and 18 used, and their respective dimensions or volumes per unit of expandable-collapsible length. When the internal bellows 17 and 18 have different diameters or unit volumes, the external bellows 19 will increase and decrease its length at as many different rates as there are internal bellows 17 and 18. Differences in length between the internal bellows 17 and 18 serve as an additional means for varying the relationship between the expansion and collapse of the external bellows 19 and the total expansion and collapse of the internal bellows 17 and 18 because such differences vary the portion of its length that the external bellows 19 collapses or expands at various rates.

The sequential expansion and collapse of the two internal bellows 17 and 18 is accomplished by attaching a hollow hemisphere 21 to the free end 22 of the upper internal bellows 17 and a hollow ring 23 to the top 24 of the lower internal bellows 18. The hollow ring 23 surrounds the lower end 25 of the upper internal bellows 17 which joins the lower internal bellows 18 and both the hollow ring 23 and the hemisphere 21 are air and liquid tight so as to be buoyant in the particular liquid in the container. Thus, when the internal portion 11 of the indicator is fully immersed in a container liquid with the direction of expansion and collapse of the internal bellows 17 and 18 generally oriented toward the surface of the container liquid, the buoyant hemisphere 21 will be urged toward the surface of the container liquid and will expand the upper internal bellows 17 and the lower internal bellows 18 and the buoyant ring 23 will be urged toward the surface of the container liquid and will expand only the lower internal bellows 18. The resultant vacuum created by the expansion of the two internal bellows 17 and 18 will draw the non-volatile liquid 20 within the interior defined by these two internal bellows 17 and 18, the connecting tube 14 and the external bellows 19 through the connecting tube 14 and out of the external bellows 19 with the result that the external bellows 19 will become fully collapsed by atmospheric pressure.

On the other hand, as the level of the liquid in the container drops past the position of the internal portion 11 of the indicator, the buoyant hemisphere 21 will first move down with the container liquid level before the buoyant ring 23 is affected by the dropping level of the container liquid. Thus, the upper internal bellows 17 is the first of the two internal bellows 17 and 18 to lose buoyant support from its buoyant element 21 and 23 and will progressively collapse independently of the lower internal bellows 18. The collapse of the upper internal bellows 17 will cause the volume of liquid 20 previously held in the fully expanded upper internal bellows 17 by the vaccum within this bellow 17 to progressively shift because of liquid 20 weight from the two upper internal bellows 17 and 18 to the external bellows 19. In order to insure the collapse of the upper internal bellows 17 with the loss of support from the container liquid as the container liquid level drops, the upper internal bellows 17 also carries a weight at its free end 22. This weight is conveniently a metal disc 26 placed between the free end 22 of the upper internal bellows 17 and the buoyant hemisphere 21 and which is not so heavy as to prevent the buoyant hemisphere 21 from raising the two internal bellows 17 and 18 in the container liquid, but which is sufficiently heavy to prevent the material or any inherent buoyancy of the upper internal bellows 17 itself or atmospheric pressure on the lower internal bellows 19 from inhibiting the collapse of the upper internal bellows 17 with the loss of support by the container liquid for the buoyant hemisphere 21.

From the foregoing, it is apparent that the initial effect of the lowering of the level of the container liquid past the indicator position is to cause only the collapse of the upper internal bellows 17 while leaving the lower internal bellows 18 fully expanded because its buoyant ring 23 is still being urged upward toward the surface of the container liquid by the container liquid. Since the interior of the upper internal bellows 17 represents only one-third of the total interior volume of the internal bellows 17 and 18, the collapse of the upper internal bellows 17 will expand the external bellows 19 only one-third of its total length although the collapse of the upper internal bellows 17 represents two-thirds of the total distance over which the two internal bellows 17 and 18 may expand or collapse. It is only after the level of the container liquid drops to or below that level which corresponds to the level of the buoyant ring 23 of the lower internal bellows 18 that the external bellows 19 begins to expand the last two-thirds of the distance necessary for full expansion. Therefore, the two internal bellows 17 and 18 and the external bellows 19 are so related that as long as the level of the container liquid is above that level which corresponds to the position of the buoyant ring 23, the external bellows 19 is substantially collapsed since the progressive collapse of the upper internal bellows 17 will not cause significant or maximum relative motion of the external bellows 19 until this particular or critical level of the container liquid is reached.

The collapse of the lower internal bellows 18 when the critical level of the container liquid is reached is insured by positioning a weight in the form of a metal ring 27 at the top 24 of the lower internal bellows 18 between the lower internal bellows 18 and the buoyant ring 23. This metal ring 27, like the buoyant ring 23, surrounds the lower end 25 of the upper internal bellows 17 which is integral with the lower internal bellows 18 and similar to the metal disc 26 associated with the upper internal bellows 17, the metal ring 27 is sufficiently heavy to prevent the material or any inherent buoyancy of the lower internal bellows 18 itself or atmospheric pressure on the external bellows 19 from inhibiting the collapse of the lower internal bellows 18 with the loss of the support for the buoyant ring 23 by the container fluid. Therefore, the two internal bellows 17 and 18 and the one external bellows 19 provide an indicator which is responsive only to a change in container liquid level which corresponds to the distance by which the lower internal bellows 18 expands and collapses.

In the specific embodiment of the invention described herein, this response of the indicator to the level of the container liquid is used to close a point in an electrical circuit. This is achieved by having the external bellows 19 expand and collapse within a lower protective cover 28 which serves not only to protect and guide the external bellows 19 as it expands and collapses, but which also carries two terminal plugs 29 at its lower end 30. These terminal plugs 29 extend into the interior of the lower protective cover 28 and each of the terminal plugs 29 is integral in the interior of the lower protective cover 28 with a contact element 31 which extends along a portion of that lower end 30 of the lower protective cover 28 which is engaged by the free end 32 of the external bellows 19 when the external bellows 19 expands to full expansion. The free end 32 of the external bellows 19 carries an outer shell 33 or covering of conductive material which serves to electrically connect the two contact elements 31 when the free end 32 of the external bellows 19 is forced into the lower end 30 of the lower protective cover 28. Thus, when the two internal bellows 17 and 18 are fully collapsed and an electrical circuit connected across the terminal plugs 29, electrical contact is made between the terminal plugs 29 of the lower protective cover 28 and this point in an electrical circuit will be closed. As previously suggested, this circuit closing action may be used to sound an alarm, to initiate pumping of liquid into a container or to transfer liquid input or output from one container to another. However, it is apparent that the making or breaking of an electrical circuit by external bellows 19 motion may be used to initiate any one or more of a variety of actions.

It should be noted that since the external bellows 19 does not begin to move the greater part of the total length of its expandable-collapsable motion until the level of container liquid drops to the level of the buoyant ring 23 of the lower internal bellows 18, the free end 32 of the external bellows 19 with its shell 33 of conductive material is maintained well away from the contact elements 31. More significantly, it should be noted that a significant distance between the free end 32 of the external bellows 19 and the contact elements 31 will be maintained until this liquid level is reached by the container liquid in spite of container motion or the surging of container liquid. This is not only because of the extra distance provided until the upper internal bellows 17 is fully collapsed and the independent buoyancy of both internal bellows 17 and 18, but also because when the upper internal bellows 17 is fully expanded, its buoyant hemisphere 21 also tends to urge the lower internal bellows 18 upward so as to provide an extra buoyant force tending to keep the lower internal bellows 18 fully expanded. Moreover, it should be noted that a particular distance between the free end 32 of the external bellows 19 and the contact elements 31 corresponding to a particular container liquid level will tend to be maintained in spite of container motion or the surging of container liquid by the fact that the relatively small diameter of the connecting tube 14 prevents the sudden shifting of the liquid 20 between the internal portion 11 of the indicator and the external portion 13 of the indicator.

Thus, not only does the indicator-structure insure that the two internal bellows 17 and 18 will collapse the greater portion of their combined expandable-collapsible length while the external bellows 19 is expanding less than half of its expandable-collapsible length, but it also insures that the motion of the external bellows 19 is restricted until the container liquid level reaches the hollow ring 23 in spite of container motion or the surging of the container liquid. In short, the indicator effectively responds to close an electrical circuit only when the level of a container liquid moves a distance corresponding to the length by which the lower internal bellows 18 expands and collapses and spurious response or closing of a point in an electrical circuit when the container liquid level is above the position of the buoyant ring 23 is prevented.

Moreover, it is apparent from the foregoing that these response characteristics can be varied to suit particular applications by selecting sizes or dimensions for the internal bellows 17 and 18 and the external bellows 19 in a manner consistent with the specific embodiment of the invention described herein. More specifically, it is apparent that by increasing the length of the upper internal bellows 17 and by shortening the length of the lower internal bellows 18, the indicator can be made to effectively respond to a smaller change in the level of the container liquid. This is because the change in the level of container liquid to which the indicator effectively responds is defined by the length of the lower internal bellows 18 and and although the shortening of its length would tend to bring the free end 32 of the external bellows 19 closer to the contact elements 31 before the last step of the external bellows 19 expansion occurs in response to the collapse of the lower internal bellows 18, the extra distance between the free end 32 of the external bellows 19 and the contact elements 31 provided by the upper internal bellows 17 until it fully collapses and the fact that the lower internal bellows 18 will not start to collapse until the upper internal bellows 17 has fully collapsed will in many applications make a relatively short final expansion step for the external bellows 19 adequate to prevent spurious opening and closing of an electrical circuit controlled by the indicator. Moreover, the actual distance which the external bellows 19 must expand during this final expansion step can always be increased by shortening the diameter and increasing the length of the external bellows 19 with reference to the diameter and length of the lower internal bellows 18.

In addition, it should be noted that although the specific embodiment of the invention described herein uses two internal bellows 17 and 18, it is possible to use more than two internal bellows and thus increase the number of steps by which the free end 32 of the external bellows 19 approaches the contact elements 31. An increase in the number of internal bellows 17 and 18 will not only cause the free end 32 of the external bellows 19 to approach the contact elements 31 at successively different rates, with each rate depending upon the configuration of each of the internal bellows 17 or 18, but it will also provide additional expanded interiors, each maintained by its own separate buoyant element 21 or 23 and each tending to maintain the free end 32 of the external bellows 19 away from the contact elements 31 until the level of its particular buoyant element 21 or 23 has been passed and the buoyant element 21 or 23 of the next lower internal bellows 17 or 18 has been reached by the container liquid level. In this manner, the distance between the free end 32 of the external bellows 19 and the contact elements 31 which corresponds to the collapse of that internal bellows 18 which collapses last with the dropping of container liquid level can be made quite small while at the same time being effectively maintained until it is reached in spite of the motion of the container or the surging of the container liquid.

To be even more specific by way of example, if starting with the internal bellows 17 just above the lower internal bellows 18, each internal bellows 17 or 18 of a plurality of internal bellows has a diameter less than a length greater than the internal bellows 17 or 18 just below it, the unit of distance by which the free end 32 of the external bellows 19 approaches the contact elements 31 for each unit that the continer liquid drops can be made to become progressively greater as the container liquid drops past and collapses each of the plurality of internal bellows 17 or 18. As already indicated, such an arrangement with each of the plurality of internal bellows 17 or 18 independently supported by a buoyant element 21 or 23 will keep the free end 32 of the external bellows 19 away from the contact elements 31 and retard motion of the free end 32 of the external bellows 19 toward the contact elements 31 until the lower internal bellows 18 is reached by the container liquid level. Thus, the distance between the free end 32 of the external bellows 19 and the contact elements 31 is maintained in the manner described above until this container liquid level is reached. Yet, the change in container liquid level to which the indicator responds as defined by the collapse of the lower internal bellows 18 can be made quite small. Moreover, although a stack of internal bellows 17 and 18 having exactly the same diameter but each buoyed by its separate buoyant element 21 or 23 would sacrifice the disproportionate relationship between the amount of container liquid level change and the motion of the free end 32 of the external bellows 19, it should be noted that even this arrangement or a single bouyed internal bellows 18 would be useful in applications where container liquid motion, the surging of the container liquid or other conditions does not require that the maximum possible distance be maintained between the free end 32 of the external bellows 19 and the contact elements 31 until the last expansive step of the external bellows 19 is reached.

In order to guide the expansion and collapse of the internal bellows 17 and 18, a wire cage 34 is provided. In the sepecific embodiment of the invention described herein, this wire cage 34 has a contour generally following the contour of the two internal bellows 17 and 18 and the buoyant components 21 and 23 associated with them when the two internal bellows 17 and 18 are fully expanded. This cage 34 not only insures that expansion and collapse of the two internal bellows 17 and 18 will be generally linear, but it permits full and easy access to the buoyant hemisphere 21 and the buoyant ring 23 by the liquid in the container. It should be noted that the hemispherical shape of the buoyant hemisphere 21 insures that the upper internal bellows 17 will not snag or catch the cage 34 as the upper internal bellows 17 expands and that the rounded edge 35 of the buoyant ring 23 insures that the lower internal bellows 18 will not snag or catch the cage 34 as the lower internal bellows 18 expands. A similar rounding of the free end 32 of the external bellows 19 insures that the external bellows 19 will not become caught at it expands within the lower protective cover 28.

Although the relationship of the two internal bellows 17 and 18 to each other and to the external bellows 19 will prevent the opening or closing of an electrical circuit through the indicator until that level of container liquid corresponding to the collapse of the lower internal bellows 18 is reached, the possibility of the spurious opening and closing of an electrical circuit by container motion or container liquid surging is further inhibited by enclosing the internal bellows 17 and 18 and the cage 34 within an upper protective cover 36 having access holes 37 around its base which permit the movement of container liquid into the upper protective cover 36 and exit holes 38 at its top to permit the movement of air as the upper protective cover 36 fills with or empties of container liquid. This upper protective cover 36 effectively isolates the buoyant hemisphere 21 of the upper internal bellows 17 from the surging of liquid in the container. Moreover, since this buoyant hemisphere 21 not only has a buoyant effect on the upper internal bellows 17, but also on the lower internal bellows 18 when the upper internal bellows 17 is fully expanded, the isolation of the buoyant hemisphere 21 will also tend to stabilize the lower internal bellows 18 in the presence of surging container liquid.

This upper protective cover 36 arrangement provides effective additional protection of the indicator from surging of container liquid when the plate 39 upon which the lower internal bellows 18 is mounted is flush against the bottom or plug 15 of the container. However, when a connecting tube 14 having a length 16 extending into the container and which removes the plate 39 from the bottom of the container is used, the access holes 37 of the upper protective cover 36 can be replaced by apertures 40 in the plate 39. These apertures 40 will permit the container liquid to rise and fall within the upper protective cover 36, but their location will isolate both of the internal bellows 17 and 18 from any surging of the container liquid which is not substantially in an up and down direction within the container and even this type of surging will be restricted by the generally closed structure of the upper protective cover 36.

It should be mentioned that in applications such as in aircraft where there is a possibility that a fuel tank or other container will be partially or completely inverted for very short periods of time, it is necessary to recognize that the inverting of the indicator within a container or fuel tank will result in the collapse of the two internal bellows 17 and 18 because their buoyant elements 21 and 23 will be urged by the container liquid toward the plate 39 upon which the lower internal bellows 18 is mounted. This, in turn, will cause the undesired closing of the electrical circuit controlled by the indicator unless provision is made for opening the circuit at another point whenever the container or fuel tank is inverted. Provision for such an event can be easily accomplished by inserting an attitude actuated switch in the electrical circuit in series with the indicator and which is arranged to open a point in the electrical circuit only when the container or fuel tank is inverted.

The outer portion 13 only of the indicator described herein provides a convenient attitude actuated switch for this purpose if the free end 32 of the external bellows 19 is weighted, the interior of the external bellows 19 is vented to the air, and if the external bellows 19 is positioned to collapse toward the ground under the influence of its weight when the fuel tank or other container is inverted while remaining in that position shown in FIGURE 3 when the container is upright. However, it should be noted that such an attitude actuated switch will not be necessary if the indicator is in the actual bottom of the container or fuel tank and if the container or fuel tank is not full of liquid since when the container or fuel tank is inverted under these conditions, the two internal bellows 17 and 18 will simply hang down in expanded condition under the influence of their respective weights 26 and 27 and will not collapse to expand the external bellows 19 so as to close the point in an electrical circuit controlled by the indicator.

Moreover, when the indicator is used in applications in which the atmospheric pressure on the external bellows 19 is so small as to be insufficient to collapse the external bellows 19 when a vacuum is created above the container liquid 20 by the expansion of the internal bellows 17 and 18, it will be necessary to position a spring between the free end 32 of the external bellows 19 and the lower end 30 of the outer protective cover 28. In addition, it should be noted that although the lower protective cover 28 is not air tight, atmospheric pressure on the external bellows 19 can be further insured by providing holes in the lower protective cover 28.

Finally, it should be emphasized that regardless of the specific application in which the indicator is used, it has no moving parts extending into the container and no electrical elements within the container. Moreover, it should be noted that the liquid 20 within the indicator is completely isolated from the container liquid and will not contaminate or otherwise influence the container liquid.

What is claimed as invention is:

1. A device for opening and closing a point in an electrical circuit in response to a particular surface level of a container liquid in a container comprising, in combination, a plurality of hollow bellows having their hollow interiors connected to and communicating with each other for positioning within a container, said plurality of hollow bellows comprising at least a lowermost bellows and an uppermost bellows, each of the plurality of bellows having an upper end, each of the said plurality of bellows except for the lowermost bellows each having the volume of its hollow interior less than the volume of the hollow interior of the bellows next below it and a length greater than the length of the bellows next below it; a remote bellows for positioning outside a container with one end for fixedly positioning with respect to a container, said remote bellows having a movable end and a hollow interior joined to the hollow interior of the lowermost bellows and with a volume which is equal to the sum of the volumes of the hollow interiors of said plurality of bellows; a plurality of metal weights, each metal weight being operatively connected with the upper end of one of said plurality of bellows; a plurality of buoyant elements each operatively connected with one of the plurality of metal weights; an electrically conductive shell depending from the movable end of said remote bellows; two contact elements for positioning outside the container in positions electrically remote from each other and in which the said contact elements will be both engaged by the conductive shell only when the remote bellows is fully expanded; two terminal plugs, each terminal plug being operatively connectable with one of the two contact elements; and a non-volatile liquid filling the hollow interiors of the plurality of bellows and the hollow interior of the remote bellows.

2. A device for opening and closing a point in an electrical circuit in response to a particular surface level of a container liquid in a container comprising, in combination, upper and lower expandable-collapsible means having interiors in communication with each other for expansion and contraction within a container in response to a liquid surface level in a container; a third expandable-collapsible means in vertical alignment and communicating with said upper and lower expandable-collapsible means that expands and collapses in response to said collapse and expansion of said upper and lower expandable-collapsible means, said third expandable-collapsible means adapted to be positioned outside a container and being expanded less than one-half of its total expansion when said upper expandable-collapsible means is fully collapsed and said lower expandable-collapsible means is totally expanded; and means carried by said third expandable-collapsible means for closing the point in an electrical circuit only when said third expandable-collapsible means has totally expanded and said upper and lower expandable-collapsible means are fully collapsed.

3. A device for opening and closing a point in an electrical circuit in response to a particular surface level of a container liquid in a container comprising, in combination, a lower bellows adapted to be positioned within a container with its direction of expansion and collapse generally perpendicular to the surface of a container liquid, said lower bellows having a length, a hollow interior with a volume, an end adapted to be fixedly positioned with reference to a container, and a movable end; an upper bellows adapted to be positioned within a container above the lower bellows and with its lower end integral with the movable end of the lower bellows, said upper bellows having a direction of expansion and collapse generally coinciding with the direction of expansion and collapse of the lower bellows, a hollow interior connected to the hollow interior of the lower bellows at the movable end of the lower bellows, a volume less than the volume of the hollow interior of the lower bellows, a length greater than the length of the lower bellows, and a free end more remote from the lower bellows than its lower end; a third bellows adapted to be positioned outside a container, said bellows having a hollow interior whose volume is equal to the sum of the volume of the hollow interior of the lower bellows and the volume of the hollow interior of the upper bellows, said third bellows having one end adapted to be fixedly positioned with reference to a container and a movable end which is free to move as said third bellows expands and collapses; a tube joining the hollow interior of the third bellows to the hollow interior of the lower bellows; a metal ring fixedly attached to the movable end of the lower bellows and having sufficient weight to collapse the lower bellows; a buoyant ring fixedly attached to the metal ring and having sufficient buoyancy in a container liquid to support its own weight and the weights of the lower bellows and the metal ring; a metal disc fixedly attached to the free end of the upper bellows and having sufficient weight to collapse the upper bellows; a buoyant hemisphere fixedly attached to the metal disc and having sufficient buoyancy in a container liquid to support its own weight and the weights of the upper bellows and the metal disc; a wire cage surrounding the upper bellows and the lower bellows and having a configuration which follows the configuration of the lower bellows and the upper bellows when said upper and lower bellows are fully expanded; an upper protective cover completely surrounding the upper bellows, the lower bellows and the wire cage and having access holes adjacent to the lower bellows and exit holes adjacent to the upper bellows when the upper bellows is fully expanded; an electrically conductive shell fixedly applied to the movable end of the third bellows; a lower protective cover surrounding the third bellows and the conductive shell as the third bellows expands and collapses and having an interior surface contiguous with the conductive shell when the third bellows is fully expanded; two contact elements positioned against the said interior surface of the lower protective cover electrically remote from each other, each contact element being positioned so that they will both be engaged by the conductive shell only when the third bellows is fully expanded; two terminal plugs extending through the lower protective cover, each terminal plug being operatively connected within the lower protective cover with one of the two contact elements; a non-volatile liquid which completely fills the hollow interior of the upper bellows, the hollow interior of the lower bellows, the hollow interior of the third bellows and the tube when the third bellows is collapsed.

4. A device as described in claim 3 wherein the buoyant hemisphere has sufficient buoyancy in a container liquid to support not only its own weight and the weights of the upper bellows and the metal disc but also the weights of the lower bellows, the metal ring and the buoyant ring and to the degree necessary to expand the upper bellows and lower bellows and create a vacuum in the upper bellows and lower bellows.

5. A device for opening and closing a point in an electrical circuit in response to a particular surface level of a container liquid within a container comprising, in combination, a container; a container liquid in said container and having a surface; a plate positioned at the lower end of said container and having a periphery; an internal expandable-collapsible component positioned within said container with its direction of expansion and collapse generally perpendicular to the surface of the container liquid and having a hollow interior with a volume, its lower end fixedly attached to the plate within the periphery, and its upper end free to move in the container liquid as it expands and collapses; an external expandable-collapsible component positioned outside the container in juxtaposition with said internal expandable-collapsible component and having a hollow interior with volume equal to the volume of the hollow interior of the internal expandable-collapsible component, one end fixedly positioned with reference to the container, and a movable end; a connecting tube extending through the container and the plate and joining the hollow interior of the external expandable-collapsible component to the hollow interior of the internal expandable-collapsible component; an upper protective cover completely surrounding the internal expandable-collapsible component, said upper protective cover being integral at its bottom with the periphery of the plate and having exit holes at its top adjacent to the upper end of the internal expandable-collapsible component when the internal expandable-collapsible component is fully expanded; a lower protective cover completely surrounding the external expandable-collapsible component without inhibiting the expansion and collapse of the external expandable-collapsible component; a plurality of electrical contact elements positioned within the lower protective cover at locations electrically remote from each other; an electrically conductive shell movable with the movable end of the external expandable-collapsible component so as to engage said contact elements only when the external expandable-collapsible component is fully expanded; a plurality of terminal plugs, each terminal plug extending through the lower protective cover and integrally associated within the lower protective cover with one of the plurality of contact elements; and a nonvolatile liquid filling the hollow interior of the internal expandable-collapsible component, the hollow interior of the external expandable-collapsible component, and the connecting tube when the external expandable-collapsible component is collapsed.

6. A device as described in claim 5 wherein a wire cage surrounds the internal expandable-collapsible component and has a configuration similar to the configuration of the internal expandable-collapsible component when the internal expandable-collapsible component is fully expanded.

7. A device for opening and closing an electrical circuit in response to a surface level of a liquid in a container comprising, in combination, a container having a bottom surface, a liquid in said container, a plurality of expandable-collapsible components having interiors of different volumes communication with each other and in vertical alignment within said container on said bottom surface, weight means connected to said expandable-collapsible components for collapsing with its weight said expandable-collapsible components, means buoyant in said liquid for expanding with its buoyancy the expandable-collapsible components and having sufficient buoyancy in the liquid to support the weight of the weight means and to expand the expandable-collapsible components, and means responsive to the expansion and collapse of the expandable-collapsible components for closing an electrical circuit when the expandable-collapsible components are fully collapsed.

References Cited by the Examiner

UNITED STATES PATENTS

| | | | |
|---|---|---|---|
| 1,857,644 | 5/32 | Knoblock | 137—796 |
| 2,301,924 | 11/42 | Beach | 200—140 X |
| 2,586,449 | 2/52 | Whitten | 200—84 |
| 2,777,030 | 1/57 | MacGriff et al. | 200—84 |
| 2,914,630 | 11/59 | Ralston | 200—83 |
| 2,959,963 | 11/60 | Watrous | 92—38 X |
| 2,993,965 | 7/61 | Morgan | 200—83 |

BERNARD A. GILHEANY, *Primary Examiner*.